United States Patent [19]
Noik et al.

[11] Patent Number: 6,065,539
[45] Date of Patent: May 23, 2000

[54] WELL CEMENTING METHOD AND MATERIAL CONTAINING FINE PARTICLES

[75] Inventors: Christine Noik, Le Pecq; Alain Rivereau, Rueil Malmaison, both of France

[73] Assignee: Institute Francois du Petrole, Rueil Malmaison, France

[21] Appl. No.: 09/085,175

[22] Filed: May 28, 1998

[30] Foreign Application Priority Data

May 28, 1997 [FR] France .................................. 97 07208

[51] Int. Cl.⁷ .................................................. E21B 33/13
[52] U.S. Cl. ........................................... 166/295; 166/276
[58] Field of Search .................... 166/295, 276, 166/294, 285

[56] References Cited

U.S. PATENT DOCUMENTS

| | | | |
|---|---|---|---|
| 2,796,934 | 6/1957 | Vogel | 166/33 |
| 3,776,311 | 12/1973 | Carnes et al. | 166/295 |
| 4,015,995 | 4/1977 | Hess | 106/287 |
| 4,042,032 | 8/1977 | Anderson et al. | 166/276 |
| 4,085,802 | 4/1978 | Sifferman et al. | 166/295 |
| 4,694,905 | 9/1987 | Armbruster | 166/280 |
| 4,785,884 | 11/1988 | Armbruster | 166/280 |
| 4,964,465 | 10/1990 | Surles | 166/295 |

FOREIGN PATENT DOCUMENTS 1 247 352  12/1988  Canada.

OTHER PUBLICATIONS

Abstract, Database WPI, Week 9746, AN 97–078 091 C, Derwent Publications, Ltd., London, GB.
Abstract, Database WPI, Week 8428, AN84–175347, Derwent Publications, Ltd., London, GB.

*Primary Examiner*—William Neuder
*Assistant Examiner*—Zakiya Walker
*Attorney, Agent, or Firm*—Millen, White, Zelano & Branigan

[57] ABSTRACT

A method of cementing a casing in a well drilled in the ground comprises injecting a liquid material comprising phenol-formol resin from the surface, wherein the resin is modified by means of a determined amount of furfuryl alcohol, and an amount of mineral filler unreactive towards the resin is added. The invention further relates to a thermosetting cementing material comprising phenol-formol resin. The resin is modified by means of an amount of furfuryl alcohol and comprises at least a proportion of an unreactive granular filler.

14 Claims, 1 Drawing Sheet

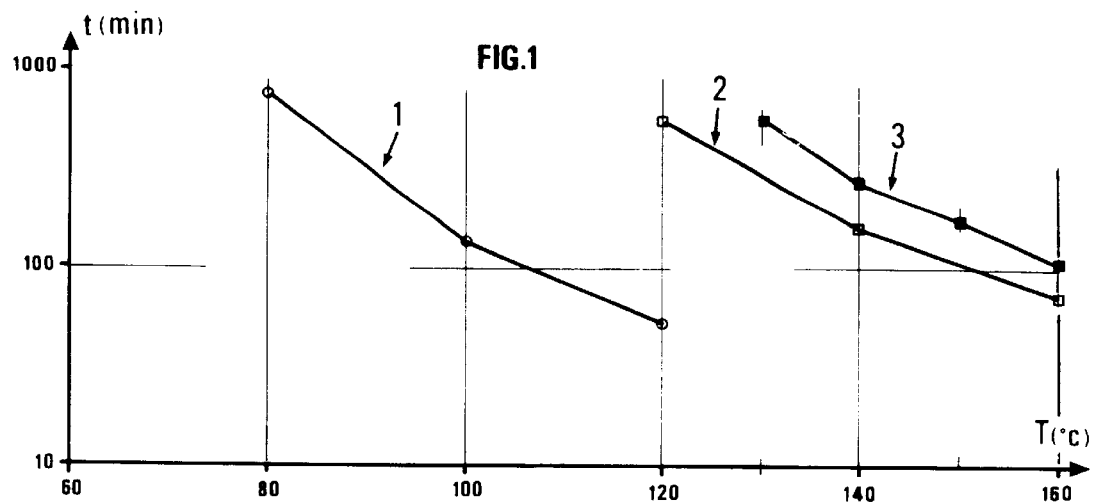
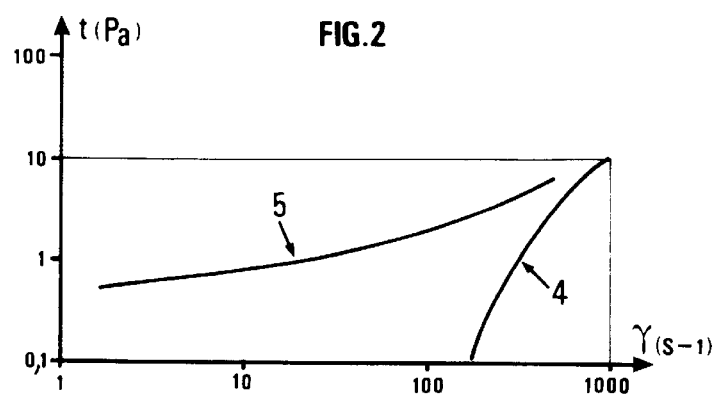
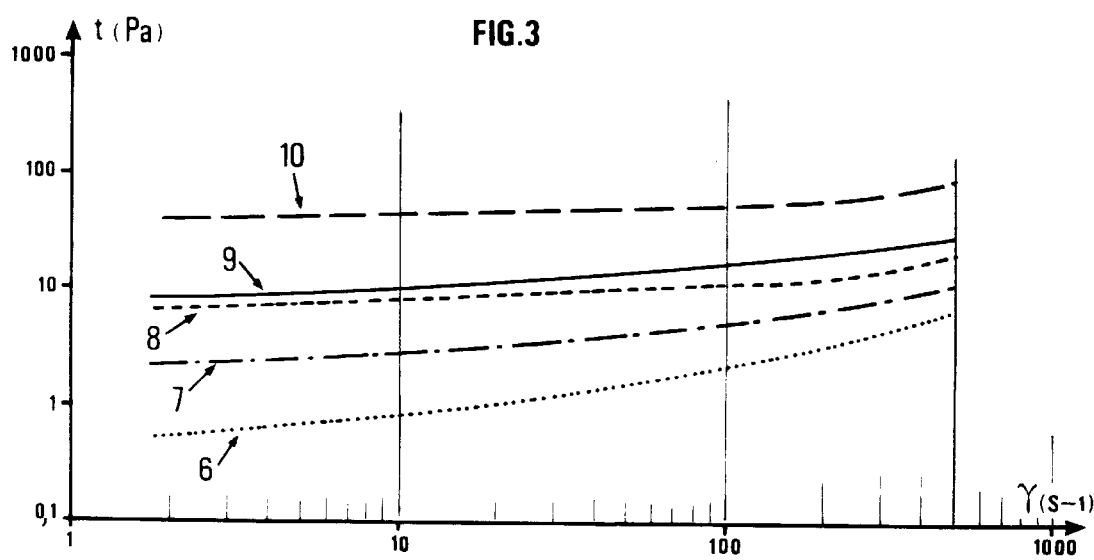

WELL CEMENTING METHOD AND MATERIAL CONTAINING FINE PARTICLES

FIELD OF THE INVENTION

The object of the present invention relates to the field of casing cementing in boreholes drilled in the subsoil, either for oil exploration or development purposes or for geothermal programs.

The field of the present invention is not limited to primary cementing, it may also be advantageously used for complementary or repair cementing operations. The invention can be advantageously applied in wells where the annular space between the casing and the borehole is narrow, i.e. in the case of boreholes referred to as slim holes.

BACKGROUND OF THE INVENTION

Cementing operations are conventionally performed with slurry formulations based on hydraulic cement and completed with other additives. It is well-known that high temperature and high pressure conditions are very difficult for the success of cementing operations because notably the rheology of such slurries is difficult to control or adjustment of the setting time is very delicate. Alternative cementing slurry systems based on thermosetting resin have already been proposed, but none of the proposed solutions proposes the formulation according to the present invention.

SUMMARY OF THE INVENTION

The present invention thus relates to a cementing method in a well drilled in the ground wherein a liquid material comprising phenol-formol resin is injected from the surface. According to the invention, the following stages are carried out:

the resin is modified by means of a determined amount of furfuryl alcohol so as to obtain a setting time of said material compatible with the injection time and the bottomhole conditions, notably the pressure and the temperature, an amount of mineral filler unreactive towards the resin is added so as to obtain a determined viscosity of said material during injection.

In the method, a mixture of unreactive fillers of grain sizes ranging between 0.01 and 100 $\mu$m can be used, the dry compactness of said mixture being optimized.

The invention further relates to a thermosetting material for cementing in a well drilled in the ground, comprising phenol-formol resin. The resin is modified by means of an amount of furfuryl alcohol and it comprises at least a proportion of an unreactive granular filler intended to stabilize the viscosity of said liquid material as a function of the temperature. The fillers are referred to as "unreactive" according to the present invention because they have no chemical reactivity towards the resin systems. However, these unreactive fillers can exhibit a certain hydrophilic character which makes them reactive towards water, but without forming a lattice leading to a solid material as one which would be formed by cement particles.

The resin can be a resol type phenol-formaldehyde resin.

The filler can be selected from the group consisting of silica smoke, silica, microsilica, calcium carbonate or a mixture thereof. Some of these fillers can form gels with water, but no solid matrix.

The material can have a microsilica content ranging between 0.5 and 2% by weight.

The material can have a silica smoke or a $CaCO_3$ content ranging between 10 and 50% by weight.

One of the problems of phenolic resins is the production of water during condensation. This water can introduce anisotropy in the matrix lattice and lead to mechanical behaviour losses after solidification.

In order to decrease the amount of water, using a reactive solvent has been considered here, i.e. a solvent which directly goes into the reaction balance. Thus, according to the present invention, furfuryl alcohol totally or partly replaces water as the main solvent of phenolic resin.

When we have formaldehyde and phenol in the presence of furfuryl alcohol, it is therefore possible to obtain more complex entanglements modifying the reactivity of the resin system. The setting time can thus be controlled by varying the proportion of furfuryl alcohol.

BRIEF DESCRIPTION OF THE DRAWINGS

Other features and advantages of the invention will be clear from reading the description hereafter of tests, with reference to the accompanying drawings wherein:

FIG. 1 gives the setting time as a function of the temperature,

FIG. 2 gives the rheograms of a formulation with or without a filler,

FIG. 3 gives, by way of comparison, the rheograms of formulations comprising different fillers.

DETAILED DESCRIPTION OF THE INVENTION

The resins tested are defined hereafter by their trade name or number belonging to the BORDEN company, as well as by their composition given by the maker, completed by other measurements. These are phenolic resins, preferably phenol-formol resins, in particular resol type phenol-formaldehyde resins.

The residual water content of the solid resins is determined by differential thermal analysis TGA. The amount of water in the initial product is measured by means of the Karl Fischer method or by azeotropic distillation. Similarly, the free phenol and furfuryl alcohol concentrations are determined after chloroform extraction and chromatographic separation.

TABLE 1

| Resins | BORDEN 5002 | BORDEN 5004 |
|---|---|---|
| Viscosity at 25° C. (Pa.s) | 0.07 | 0.021 |
| Density at 20° C. | 1.19 | 1.16 |
| pH at 20° C. | 7.95 | 8.70 |
| Dry matter after 2 h | | |
| at 150° C. | 62% | 38% |
| at 250° C. by TGA | 36% | 62% |
| Water content % (value provided) | 17% | 9% |
| Karl-Fischer test | 19–23% | 12% |
| Free phenol content | — | — |
| TGA extraction test | 5.3% | 4.7% |
| Furfuryl alcohol content chromatographic determination | — | 38% |

A resin 5005 (BORDEN) which notably differs from resin 5004 in a furfuryl alcohol content of about 50% is also tested.

Method of Operation

A RAYNERI paddle agitator has been used to prepare the formulations. With this type of device, the agitating speed was set to 500 rpm for about 30 minutes.

For formulations containing mineral fillers, agitation was performed with a WARING mixer for 5 minutes.

Setting Time Measurement

The setting time of resins is determined according to the thickening time determination technique.

The thickening time is determined with a consistometer according to a procedure defined by the petroleum cementing standards API 10. This device mainly consists of a cylindrical vessel containing the material, equipped with a stationary agitator paddle. This assembly is dipped in a pressurized thermostat-controlled cell. The rotating speed of the bowl is 150 rpm, the agitator is secured to a calibrated spring and to a potentiometer allowing to measure the torque exerted on the paddle by the cement. The spring is periodically calibrated with a weight calibration equipment. The end of the test is determined by the torque measurement.

As soon as it is prepared, the formulation is set in the cylindrical vessel. The latter is closed by a flexible diaphragm which isolates the resin from the pressurization oil while transmitting the pressure. After applying an initial pressure, heating is started with a predetermined warm-up rate. The pressure is readjusted, at the end of the warm-up time, to the value required for the test.

Measurement of the thickening time ends when the torque reaches the limit set during calibration. It is the time passed since heating has been started which determines the thickening time.

Rheological Measurements

A HAAKE viscometer associated with a thermostat-controlled cell is used. The working principle of this device is based on the "single air gap" or "double air gap coaxial cylinders" configuration.

The fluid to be studied is placed in the stator, the internal cylinder being connected to the rotor. The internal and external cylinders are provided with grooves in the direction of the generating lines in order to prevent slippage on the wall. The rotating speed and the torque measurement are achieved on the shaft of the rotor. The velocity gradient or deformation rate on the wall of the internal cylinder is linked with the rotating speed of the rotor. The tangential stress on the wall is linked with the moment of resistance measured on the shaft of the rotor.

The flow law relating the stress $\tau$ (Pa) to the shear rate $\gamma$ ($s^{-1}$) is associated with a mathematical model. Examples of the commonest models are:

Newtonian model: $\tau = \mu \gamma$ with $\mu$ the viscosity

Ostwald model: $\tau = K\gamma^n$ with the consistency index and n the fluid behaviour index Bingham model : $\tau = \tau_o + \mu \gamma$ with $\mu$ the plastic viscosity and $\tau_o$ the threshold stress.

Material Characterization

Setting of the resins is performed in 7-cm high molds having an inside diameter of 2.5 cm. Prior to pouring the resin, the molds are previously coated with grease and silicone. After filling with the selected resin, the molds are placed in a setting cell under temperature and pressure conditions. The samples are thereafter redimensioned and characterized, notably by measurement of the compressive strength and of the permeability.

Compressive Strength $R_c$

The testing device comprises a stationary lower plate and an upper plate to mounted on a knuckle joint. The compression stress is applied until the cylindrical sample of section S breaks. The maximum applied load F is measured by means of the device. The compressive strength is defined by the relation: $R_c = F/S$. $R_c$ is expressed in pascal, F in newton and the surface area S in $m^2$.

Permeability

The permeability constant K is evaluated from the injection of water into a resin sample subjected to a confining pressure of 40 bars. The system is laterally sealed by interposing a cylindrical membrane on the walls of the sample. The amount of water that has flowed off is measured alter several hours.

The calculating formula used is as follows:

$$K = \frac{\mu Q L}{S P}$$

with:

$\mu$ the viscosity of the fluid in Pa.s,

Q the flow rate in $m^3/s$,

S the section of the sample in $m^2$,

P the head of water at the sample inlet in Pa,

L the length of the sample in m,

K in $m^2$ (1 m Darcy $= 0.987 \ 10^{-15} m^2$).

Test No. 1

The setting time is measured as a function of the effect of the temperature in order to determine if, as it is, the resin on which the cementing composition is based is compatible with the setting time requirements which commonly prevail in the trade. The required setting times are generally of the order of 3 to 5 hours according to the depth of the cementing operation.

The results are shown in Table 2. The setting times of the resins are assessed in relation to the thickening time as defined above.

TABLE 2

| Temperature (° C.) | Thickening time | | |
|---|---|---|---|
| | BORDEN 5002 | BORDEN 5004 | BORDEN 5005 |
| 80 | 9 hours | >48 hours | >48 hours |
| 100 | 2 hours | >48 hours | >48 hours |
| 120 | 55 minutes | 8.33 hours | >48 hours |
| 140 | <30 minutes | 3 hours | 5 hours |

Furfuryl alcohol modified resins have setting times compatible with their use as a component of a cementing material. It can be noted that varying the proportion of furfuryl alcohol allows to readily control the setting time, considering the temperature used.

FIG. 1 shows curves giving the setting time, laid off as ordinate, as a function of the temperature, laid off as abscissa, for resin 5002 (reference number 1), resin 5004 with 78% by weight of $CaCO_3$ and 50% by weight of silica $SiO_2$ (reference number 2) and resin 5005 also with a $CaCO_3$ and sand filler (reference number 3).

It can be noted that the type of unreactive filler has practically no influence on the setting time.

Test No.2: Rheology

FIG. 2 illustrates the Theological behaviour of the resin BORDEN 5004, with or without filler, at 90° C. The rheogram gives the shear $\gamma$ ($s^{-1}$), laid off as abscissa, and the corresponding stress rate $\tau$ (Pa), laid off as ordinate. The pure resin 5004 shown by curve 4, at the test temperature (90° C.), shows that the stress rate cannot be measured in the shear range studied : from 10 to 100 $s^{-1}$. At this temperature, the resins become very fluid in relation to conventional cement slurries.

Curve 5 relates to resin 5004 to which 33% by weight of a $CaCO_3$ filler has been added. An Ostwald type rheological behaviour appears when adding a certain amount of filler. Furthermore, it has been measured that the viscosity of a resin can be readily controlled according to the grain size of the filler. For the same percentage by mass, the silica smoke filler of small grain size has a greater influence on the viscosity than a filler of larger grain size such as $CaCO_3$.

FIG. 3 shows examples of rheograms of the resin 5004 containing fillers of different natures and concentrations. Measurements have been performed at 90° C.

Curve 6 relates to a mixture containing 33% $CaCO_3$.
Curve 7 relates to a mixture containing 50% $CaCO_3$.
Curve 8 relates to a mixture containing 25% silica smoke.
Curve 9 relates to a mixture containing 78% $CaCO_3$.
Curve 10 relates to a mixture containing 50% silica smoke.

Definition of the Fillers used by Way of Example

TABLE 3

| Type of filler | Silica $SiO_2$ | Silica smoke | $CaCO_3$ | Microsilica |
| --- | --- | --- | --- | --- |
| Average grain size ($\mu$m) | 50 | 2 | 5 | 0.012 |

Influence of the nature of the filler on the thickening time of resin BORDEN 5004:

TABLE 4

| Temperature (° C.) | 5004 | 5004 + 78% $CaCO_3$ + 50% $SiO_2$ | 5004 + 25% $SiO_2$ |
| --- | --- | --- | --- |
| 120 | 8 h 20 | 9 h 10 | |
| 140 | 3 h 00 | 2 h 50 | 3 h 10 |
| 160 | 1 h 00 | 1 h 15 | 1 h 05 |

The setting time of resin 5004 is little sensitive to the amount of filler and to the nature of the unreactive filler.

Test No.3: Compressive Strength

The influence of fillers on the mechanical properties of the resins has been studied by measuring the compressive strength.

The effects of the fillers is observed on the resin 5002 set at 80° C. after 3 days. All the measurements are summed up in Table 5. Like the viscosity, the compressive strength generally increases with the amount of particles added.

Furthermore, all the compressive strength values are markedly greater than those corresponding to a conventional cement slurry formulation which is of the order of 30 to 50 MPa.

TABLE 5

Measurement of the compressive strength $R_c$ (MPa)
Resin BORDEN 5002 + filler

| % of filler | 0 | 0.5 | 1 | 2 | 5 | 10 | 15 | 20 | 25 |
| --- | --- | --- | --- | --- | --- | --- | --- | --- | --- |
| Silica smoke | 60 | | | | | 68 | 80 | 57 | 58 |
| $CaCO_3$ | 60 | | | | | 62 | 75 | | 80 |
| Microsilica | 60 | 70 | 97 | 81 | | | | 80 | 60 |

In particular, the resistance effect is the most notable for the microsilica which has the finest grain size. In fact, filling of the organic matrix is much denser with fine particles, which accounts for the compressive strength increase.

In order to try to increase the compressive strength value, mixtures of fillers whose proportions are determined by optimizing the dry compactness of the mixture can be used.

The filler formulations defined in Table 6 could be advantageously used.

TABLE 6

Filler formulations

| Formulation | No. 1 | No. 2 | No. 3 |
| --- | --- | --- | --- |
| Composition | 10% silica smoke 15% $CaCO_3$ 20% silica | 10% silica smoke 10% $CaCO_3$ 10% silica | 5% silica smoke 12.5% $CaCO_3$ 12.5% silica |
| Compressive strength $R_c$ with resin 5002 at 80° C. | 94 | 98 | 96 |

It can be seen that optimization of the mixture of fillers leads to improved compressive strength values.

Relation between the Permeability (K), the Speed of Sound (V) in the Material and the Compressive Strength ($R_c$)

Various techniques have been used in order to establish the effect of mineral fillers on a series of mechanical properties. The results of the measurements are given in the following Tables 7 and 8:

TABLE 7

Resin + 25% silica smoke

| Resins | Density | Speed of sound (m/s) | K (mDarcy) | $R_c$ (MPa) |
| --- | --- | --- | --- | --- |
| 5002 (5 days at 120° C.) | 1.35 | 2.19 | $9.2 \cdot 10^{-3}$ | 96–102 |
| 5004 (5 days at 120° C.) | 1.38 | 2.2 | $6.1 \cdot 10^{-3}$ | 53–59 |

TABLE 7

Resin + 50% $CaCO_3$

| Resins | Density | Speed of sound (m/s) | K (mDarcy) | $R_c$ (MPa) |
| --- | --- | --- | --- | --- |
| 5002 (5 days at 120° C.) | 1.54 | 2.2 | $9.2 \cdot 10^{-2}$ | 126–131 |
| 5004 (5 days at 120° C.) | 1.55 | 2.4 | $4.41 \cdot 10^{-7}$ | 49 |

The following remarks can be made concerning these measurements:

Density

The initial resin formulations having densities of the same order of magnitude, in the region of 1.1, the density values of the cementing material only depend on the type and on the nature of the filler added. For example, according to Tables 7 and 8, with 25% of silica smoke, the density obtained is in the 1.35–1.38 range, and with 50% of $CaCO_3$, the density obtained is in the 1.54–1.55 range.

Permeability

The silica smoke and the carbonate having the same grain size, the materials have comparable permeabilities for each type of resin despite the great difference in amount.

Compressive Strength

From a furfuryl alcohol modified resin, a compressive strength increase is measured between the two types of fillers, due to the difference in the proportion of filler added.

We claim:

1. A method of cementing a casing in a well drilled in a formation comprising injecting a liquid material comprising phenol-formol resin from the surface into an annular space between the casing and the formation, wherein:

said resin is modified with a determined amount of furfuryl alcohol so as to obtain a setting time for said material compatible with injection time and bottomhole conditions, notably pressure and temperature, and an amount of a mixture of mineral fillers unreactive towards said resin is added so as to obtain a determined viscosity of said material during injection, said fillers having a grain size ranging between 0.01 and 100 µm.

2. A method as claimed in claim 1, wherein said filler is selected from the group consisting of silica smoke, silica, microsilica, calcium carbonate and a mixture thereof.

3. A method as claimed in claim 2, wherein said resin is a resol type phenol-formaldehyde resin.

4. A method as claimed in claim 1, wherein said filler has a microsilica content ranging between 0.5 and 2% by weight.

5. A method as claimed in claim 4, wherein said resin is a resol type phenol-formaldehyde resin.

6. A process according to claim 1, wherein said resin is a resol type phenol-formaldehyde resin.

7. A substantially liquid viscous thermosetting material intended for cementing in a well, comprising liquid phenol-formol resin, characterized in that said resin is modified by an amount of furfuryl alcohol and said material comprises at least a proportion of an unreactive granular filler intended to stabilize the viscosity of said liquid material, as a function of temperature, said unreactive granular filler having a microsilica content of between 0.5 and 2% by weight.

8. A material as claimed in claim 7, wherein said resin is a resol type phenol-formaldehyde resin.

9. A material as claimed in claim 7, wherein said filler has a silica smoke or $CaCO_3$ content ranging between 10 and 50% by weight.

10. A material as claimed in claim 9, wherein said resin is a resol type phenol-formaldehyde resin.

11. A substantially liquid viscous thermosetting material intended for cementing in a well, comprising phenol-formol resin, characterized in that said resin is modified by an amount of furfuryl alcohol and said material comprises at least a proportion of an unreactive granular filler intended to stabilize the viscosity of said liquid material, as a function of temperature, said filler having a grain size ranging between 0.01 and 100 µm.

12. A material as claimed in claim 11, wherein said filler is selected from the group consisting of silica smoke, silica, microsilica, calcium carbonate and a mixture thereof.

13. A material as claimed in claims 12, wherein said resin is a resol type phenol-formaldehyde resin.

14. A material as claimed in claim 11, wherein said resin is a resol type phenol-formaldehyde resin.

* * * * *